(12) United States Patent
Gaal et al.

(10) Patent No.: US 9,794,923 B2
(45) Date of Patent: *Oct. 17, 2017

(54) CELL ID AND ANTENNA PORT CONFIGURATIONS FOR EPDCCH

(71) Applicant: QUALCOMM INCORPORATED, San Diego, CA (US)

(72) Inventors: Peter Gaal, San Diego, CA (US); Wanshi Chen, San Diego, CA (US); Hao Xu, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/842,762

(22) Filed: Sep. 1, 2015

(65) Prior Publication Data

US 2015/0373681 A1    Dec. 24, 2015

Related U.S. Application Data

(63) Continuation of application No. 13/765,596, filed on Feb. 12, 2013, now Pat. No. 9,155,089.

(60) Provisional application No. 61/682,186, filed on Aug. 10, 2012.

(51) Int. Cl.
*H04W 72/04* (2009.01)
*H04L 5/00* (2006.01)
*H04L 27/26* (2006.01)

(52) U.S. Cl.
CPC ........ *H04W 72/042* (2013.01); *H04L 5/0025* (2013.01); *H04L 5/0048* (2013.01); *H04L 5/0051* (2013.01); *H04L 5/0053* (2013.01); *H04L 27/2613* (2013.01)

(58) Field of Classification Search
USPC .......................................... 370/310, 329–337
See application file for complete search history.

(56) References Cited

U.S. PATENT DOCUMENTS 9,455,814 B2 * 9/2016 Kim ...................... H04L 5/0025
2008/0253318 A1   10/2008 Malladi et al.
2008/0285529 A1 * 11/2008 Kwak .................. H04B 7/2637
                                                                     370/338

(Continued)

OTHER PUBLICATIONS

International Search Report and Written Opinion—PCT/US2013/025919—ISA/EPO—dated Jun. 5, 2013.

(Continued)

*Primary Examiner* — Bunjob Jaroenchonwanit
(74) *Attorney, Agent, or Firm* — Seyfarth Shaw LLP

(57) ABSTRACT

A method of wireless communication is provided which includes receiving, at a first user equipment (UE), a first reference signal on a first set of resource elements of a first enhanced physical downlink control channel (EPDCCH). The first reference signal is mapped to a same set of antenna ports that are mapped to a second reference signal transmitted on a second set of resource elements of a second EPDCCH to at least a second UE. Furthermore, the first set of resource elements and the second set of resource elements have been selected from shared resource elements. The first set of resource elements differ from the second set of resource elements. The method also includes descrambling the received first reference signal based at least in part on a cell identification (ID) and demodulating a signal based at least in part on the descrambled first reference signal.

21 Claims, 8 Drawing Sheets

(56) References Cited

U.S. PATENT DOCUMENTS

| | | | |
|---|---|---|---|
| 2009/0135803 A1* | 5/2009 | Luo | H04L 5/0007 370/350 |
| 2009/0257449 A1* | 10/2009 | Chen | H04L 1/0041 370/470 |
| 2009/0316659 A1* | 12/2009 | Lindoff | H04J 11/0069 370/332 |
| 2010/0062783 A1* | 3/2010 | Luo | H04J 11/0069 455/450 |
| 2010/0088580 A1 | 4/2010 | Chun et al. | |
| 2010/0272004 A1 | 10/2010 | Maeda et al. | |
| 2011/0034175 A1 | 2/2011 | Fong et al. | |
| 2011/0038310 A1 | 2/2011 | Chmiel et al. | |
| 2011/0158351 A1* | 6/2011 | Gorokhov | H04B 7/0417 375/316 |
| 2011/0222501 A1 | 9/2011 | Kim et al. | |
| 2011/0243088 A1 | 10/2011 | Ahn et al. | |
| 2011/0249633 A1 | 10/2011 | Hong et al. | |
| 2011/0256868 A1* | 10/2011 | Nogami | H04J 11/0069 455/435.1 |
| 2011/0310805 A1* | 12/2011 | Nanri | H04L 61/2015 370/328 |
| 2011/0310829 A1 | 12/2011 | Ji et al. | |
| 2011/0317780 A1 | 12/2011 | Kang et al. | |
| 2012/0033571 A1 | 2/2012 | Shimezawa et al. | |
| 2012/0127913 A1 | 5/2012 | Lin et al. | |
| 2012/0188961 A1 | 7/2012 | Suzuki et al. | |
| 2012/0243500 A1 | 9/2012 | Chandrasekhar et al. | |
| 2012/0269156 A1 | 10/2012 | Quan et al. | |
| 2012/0282936 A1 | 11/2012 | Gao et al. | |
| 2012/0287799 A1 | 11/2012 | Chen et al. | |
| 2012/0314686 A1 | 12/2012 | Huang | |
| 2013/0010685 A1* | 1/2013 | Kim | H03M 13/271 370/315 |
| 2013/0016841 A1* | 1/2013 | Fong | H04L 5/001 380/287 |
| 2013/0034064 A1* | 2/2013 | Nam | H04W 72/1294 370/329 |
| 2013/0039162 A1* | 2/2013 | Zhang | H04J 13/0003 370/203 |
| 2013/0064216 A1 | 3/2013 | Gao et al. | |
| 2013/0114521 A1* | 5/2013 | Frenne | H04L 5/0053 370/329 |
| 2013/0114656 A1 | 5/2013 | Sayana et al. | |
| 2013/0163530 A1* | 6/2013 | Chen | H04W 72/04 370/329 |
| 2013/0170449 A1* | 7/2013 | Chen | H04L 1/0038 370/329 |
| 2013/0176987 A1 | 7/2013 | Kawamura | |
| 2013/0188558 A1* | 7/2013 | Nam | H04W 24/02 370/328 |
| 2013/0194931 A1 | 8/2013 | Lee et al. | |
| 2013/0195041 A1 | 8/2013 | Papasakellariou et al. | |
| 2013/0201926 A1* | 8/2013 | Nam | H04L 1/1685 370/329 |
| 2013/0201942 A1 | 8/2013 | Kim et al. | |
| 2013/0215835 A1 | 8/2013 | Chen et al. | |
| 2013/0215842 A1* | 8/2013 | Han | H04W 72/042 370/329 |
| 2013/0230029 A1 | 9/2013 | Papasakellariou et al. | |
| 2013/0235812 A1* | 9/2013 | Heo | H04L 5/001 370/329 |
| 2013/0235821 A1* | 9/2013 | Chen | H04W 72/0406 370/329 |
| 2013/0242853 A1 | 9/2013 | Seo et al. | |
| 2013/0250874 A1* | 9/2013 | Luo | H04W 72/04 370/329 |
| 2013/0279437 A1* | 10/2013 | Ng | H04W 48/16 370/329 |
| 2013/0286997 A1 | 10/2013 | Davydov et al. | |
| 2013/0294368 A1* | 11/2013 | Bendlin | H04W 72/042 370/329 |
| 2013/0329657 A1* | 12/2013 | Luo | H04W 72/042 370/329 |
| 2013/0329664 A1 | 12/2013 | Kim et al. | |
| 2013/0336133 A1 | 12/2013 | Carbonelli et al. | |
| 2014/0016556 A1 | 1/2014 | Shimezawa et al. | |
| 2014/0029584 A1 | 1/2014 | Qu et al. | |
| 2014/0036747 A1 | 2/2014 | Nory et al. | |
| 2014/0036800 A1* | 2/2014 | Frenne | H04L 5/0035 370/329 |
| 2014/0036802 A1* | 2/2014 | Chen | H04W 72/042 370/329 |
| 2014/0036804 A1* | 2/2014 | Chen | H04W 72/0406 370/329 |
| 2014/0044057 A1* | 2/2014 | Gaal | H04W 72/042 370/329 |
| 2014/0071903 A1* | 3/2014 | Sorrentino | H04W 52/26 370/329 |
| 2014/0086093 A1* | 3/2014 | Liu | H04J 13/10 370/252 |
| 2014/0105155 A1 | 4/2014 | Kim et al. | |
| 2014/0126668 A1* | 5/2014 | Kim | H04L 5/0023 375/295 |
| 2014/0192786 A1* | 7/2014 | Skov | H04W 74/0833 370/336 |
| 2014/0211736 A1* | 7/2014 | Noh | H04L 5/0051 370/329 |
| 2014/0219202 A1 | 8/2014 | Kim et al. | |
| 2014/0226616 A1 | 8/2014 | Ihm et al. | |
| 2014/0233466 A1 | 8/2014 | Pourahmadi et al. | |
| 2014/0233525 A1 | 8/2014 | Kim et al. | |
| 2014/0233663 A1* | 8/2014 | Kang | H04L 5/0037 375/260 |
| 2015/0023275 A1* | 1/2015 | Kim | H04L 5/0035 370/329 |
| 2015/0043466 A1* | 2/2015 | Yoshida | H04W 16/28 370/329 |
| 2015/0201369 A1* | 7/2015 | Ng | H04W 48/16 370/254 |
| 2016/0095127 A1* | 3/2016 | Roh | H04L 1/0003 370/330 |
| 2016/0295562 A1* | 10/2016 | Han | H04L 27/2613 |

OTHER PUBLICATIONS

Nokia et al., "Demodulation reference signal for ePDCCH", 3GPP Draft; R1-121285, 3rd Generation Partnership Project (3GPP), Mobile Competence Centre ; 650, Route Des Lucioles; F-06921 Sophia-Antipolis Cedex; France, vol. RAN WG1, No. Jeju, Korea; Mar. 26, 2012-Mar. 30, 2012, Mar. 20, 2012 (Mar. 20, 2012), XP050599575.

Texas Instruments: "Scrambling sequence initialization of DMRS for ePDCCH", 3GPP Draft; R1-122740, 3rd Generation Partnership Project (3GPP), Mobile Competence Centre ; 650, Route Des Lucioles ; F-06921 Sophia-Antipolis Cedex ; France, vol. RAN WG1, No. Prague, Czech Republic; May 21, 2012-May 25, 2012, May 12, 2012 (May 12, 2012), XP050600923.

Texas Instruments: "Need for localized and distributed ePDCCH candidates in one sub-frame", 3GPP Draft; R1-122744, 3rd Generation Partnership Project (3GPP), Mobile Competence Centre; 650, Route Des Lucioles; F-06921 Sophia-Antipolis Cedex; France, vol. RAN WG1, No. Prague, Czech Republic; May 21, 2012-May 25, 2012, May 12, 2012 (May 12, 2012), XP050600927.

* cited by examiner

CELL ID AND ANTENNA PORT CONFIGURATIONS FOR EPDCCH

CROSS-REFERENCE TO RELATED APPLICATIONS

This application is a continuation of U.S. patent application Ser. No. 13/765,596, entitled "CELL ID AND ANTENNA PORT CONFIGURATIONS FOR EPDCCH," filed on Feb. 12, 2013, which claims the benefit under 35 U.S.C. §119(e) to U.S. Provisional Patent Application No. 61/682,186, entitled "CELL ID AND ANTENNA PORT FOR EPDCCH IN LTE," filed on Aug. 10, 2012, the disclosures of which are expressly incorporated by reference herein in their entireties.

BACKGROUND

Field

Aspects of the present disclosure relate generally to wireless communication systems, and more particularly to controlling relay station activity states.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

SUMMARY

According to an aspect of the present disclosure, a method of wireless communication is disclosed. The method includes receiving, at a first user equipment (UE), a first reference signal on a first set of resource elements of a first enhanced physical downlink control channel (EPDCCH). In one configuration, the first reference signal is mapped to a same set of antenna ports that are mapped to a second reference signal transmitted on a second set of resource elements of a second EPDCCH to at least a second UE. Additionally, the first set of resource elements and the second set of resource elements may be selected from multiple shared resource elements. Finally, the first set of resource elements differ from the second set of resource elements. The method also includes descrambling the received first reference signal based on a cell identification (ID). The method further includes demodulating a signal based on the descrambled first reference signal.

Another aspect discloses an apparatus for wireless communication. The apparatus includes means for receiving, at a first user equipment (UE), a first reference signal on a first set of resource elements of a first EPDCCH. In one configuration, the first reference signal is mapped to a same set of antenna ports that are mapped to a second reference signal transmitted on a second set of resource elements of a second EPDCCH to at least a second UE. Additionally, the first set of resource elements and the second set of resource elements may be selected from multiple shared resource elements. Finally, the first set of resource elements differ from the second set of resource elements. The apparatus also includes means for descrambling the received first reference signal based on a cell ID. The apparatus further includes means for demodulating a signal based on the descrambled first reference signal.

In another aspect, a non-transitory computer-readable medium having program code recorded thereon is disclosed. The non-transitory computer-readable medium includes program code for causing at least one computer to receive, at a first user UE, a first reference signal on a first set of resource elements of a first EPDCCH. In one configuration, the first reference signal is mapped to a same set of antenna ports that are mapped to a second reference signal transmitted on a second set of resource elements of a second EPDCCH to at least a second UE. Additionally, the first set of resource elements and the second set of resource elements may be selected from multiple shared resource elements. Finally, the first set of resource elements differ from the second set of resource elements. The non-transitory computer-readable medium also includes program code for causing at least one computer to descramble the received first reference signal based on a cell ID. The non-transitory computer-readable medium further includes program code for causing at least one computer to demodulate a signal based on the descrambled first reference signal.

Another aspect discloses an apparatus for wireless communications. The apparatus includes a memory and a processor(s) coupled to the memory. The processor is configured to receiving, at a first UE, a first reference signal on a first set of resource elements of a first EPDCCH. In one configuration, the first reference signal is mapped to a same set of antenna ports that are mapped to a second reference signal transmitted on a second set of resource elements of a second EPDCCH to at least a second UE. Additionally, the first set of resource elements and the second set of resource elements may be selected from multiple shared resource elements. Finally, the first set of resource elements differ from the second set of resource elements. The processor is also configured to descramble the received first reference signal based on a cell ID. The processor is also configured to demodulate a signal based on the descrambled first reference signal.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
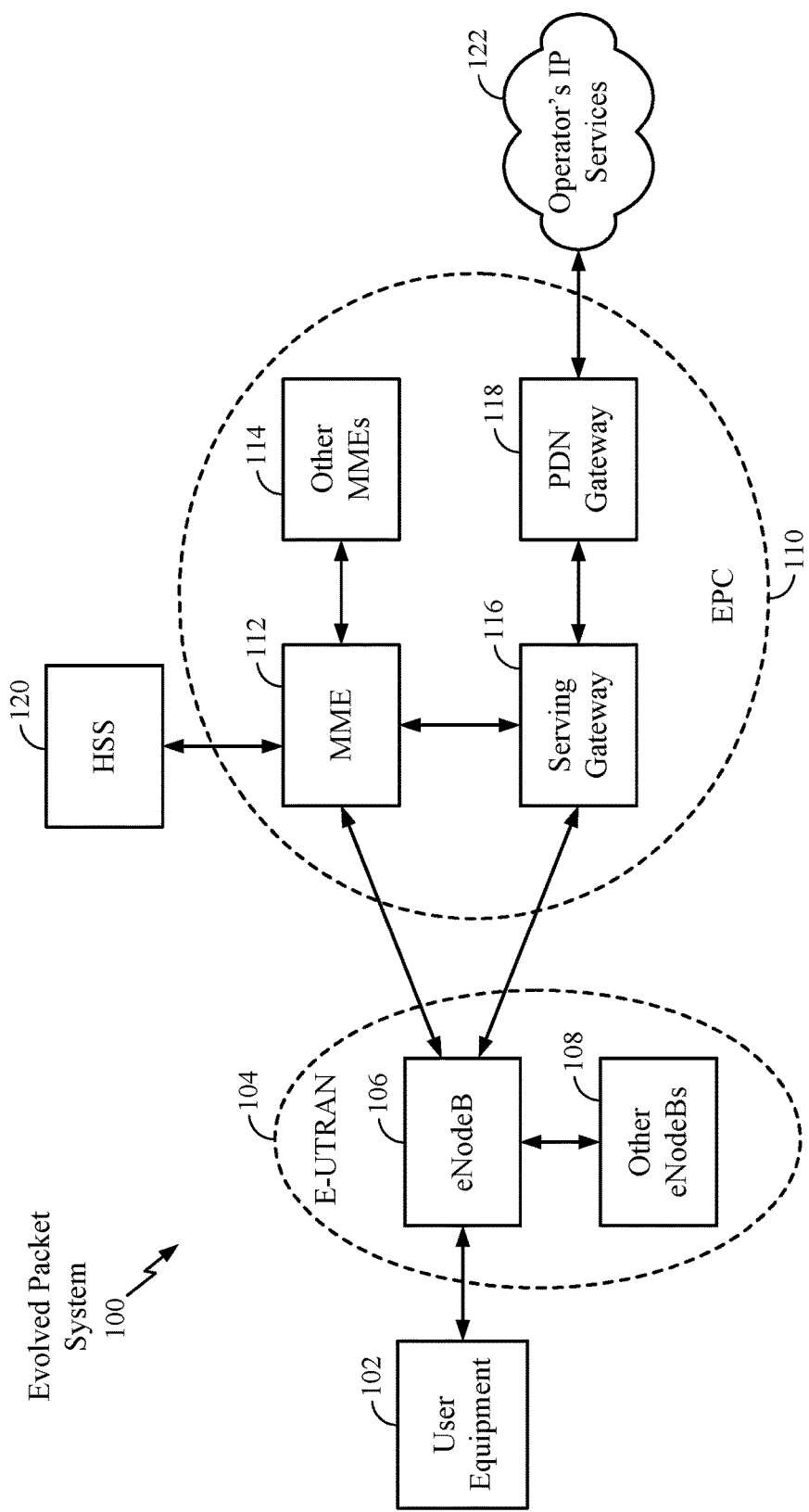
FIG. 1 is a diagram illustrating an example of a network architecture.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Aspects of the telecommunication systems are presented with reference to various apparatus and methods. These apparatus and methods are described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNodeB) 106 and other eNodeBs 108. The eNodeB 106 provides user and control plane protocol terminations toward the UE 102. The eNodeB 106 may be connected to the other eNodeBs 108 via a backhaul (e.g., an X2 interface). The eNodeB 106 may also be referred to as a base station, a base transceiver station, a radio base station, a radio transceiver, a transceiver function, a basic service set (BSS), an extended service set (ESS), or some other suitable terminology. The eNodeB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 106 is connected to the EPC 110 via, e.g., an S1 interface. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
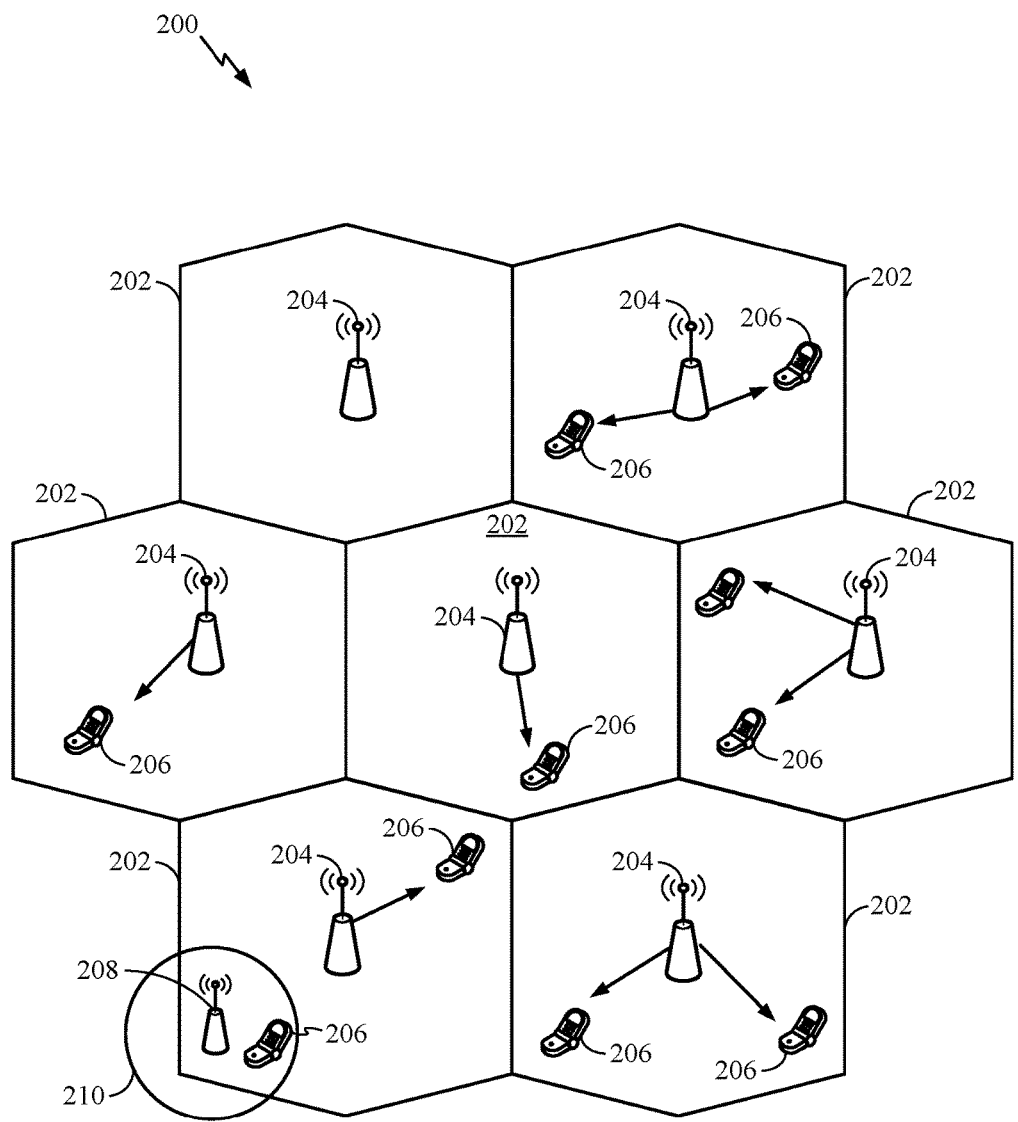
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNodeBs 208 may have cellular regions 210 that overlap with one or more of the cells 202. The lower power class eNodeB 208 may be a remote radio head (RRH), a femto cell (e.g., home eNodeB (HeNodeB)), pico cell, or micro cell. The macro eNodeBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNodeBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the downlink and SC-FDMA is used on the uplink to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeBs 204 may have multiple antennas supporting MIMO technology. The use of MIMO technology enables the eNodeBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 206 with different spatial signatures, which enables each of the UE(s) 206 to recover the one or more data streams destined for that UE 206. On the uplink, each UE 206 transmits a spatially precoded data stream, which enables the eNodeB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR).

Figure 3:
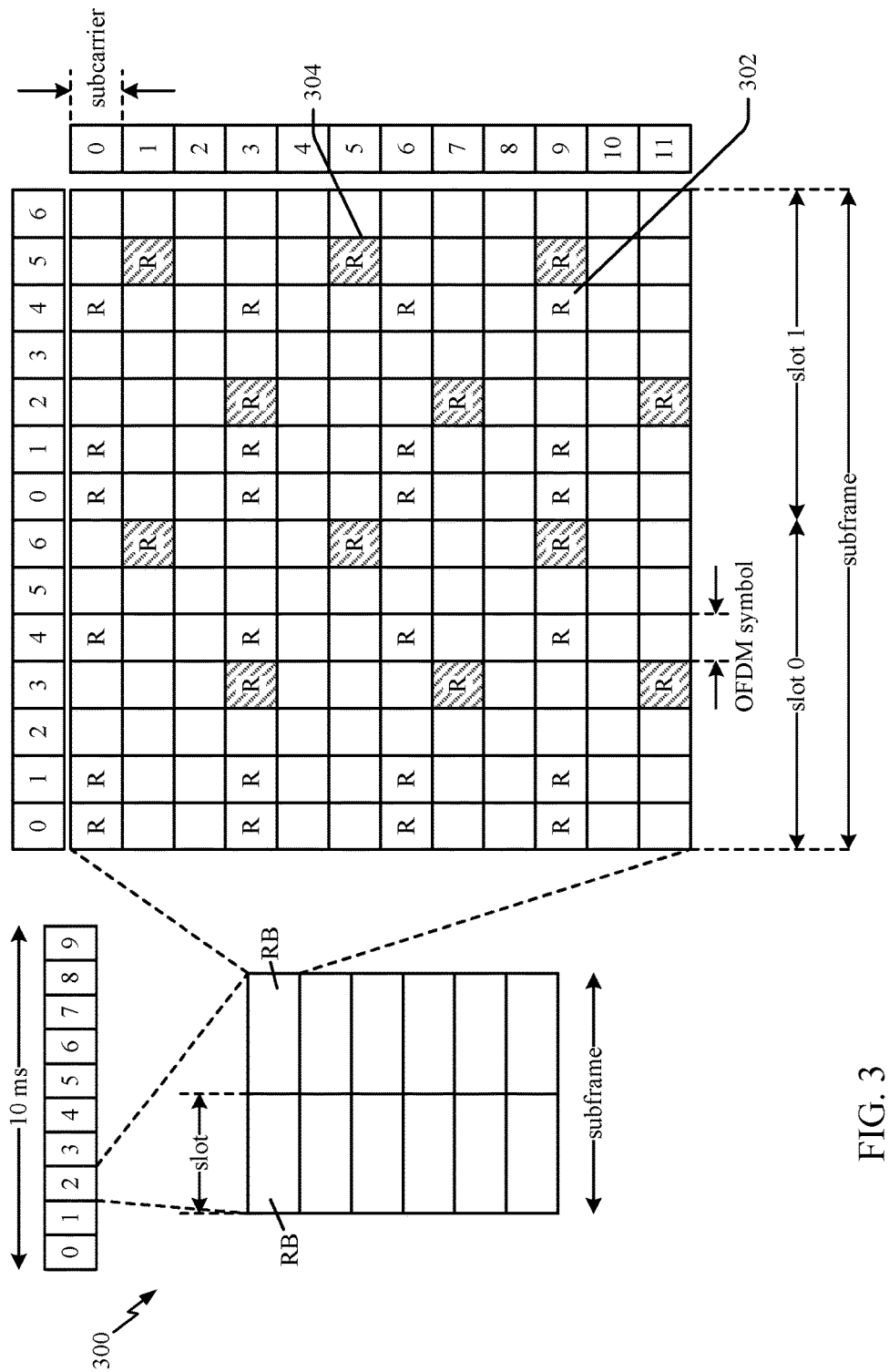
FIG. 3 is a diagram illustrating an example of a downlink frame structure in LTE.

FIG. 3 is a diagram 300 illustrating an example of a downlink frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include downlink reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 4:
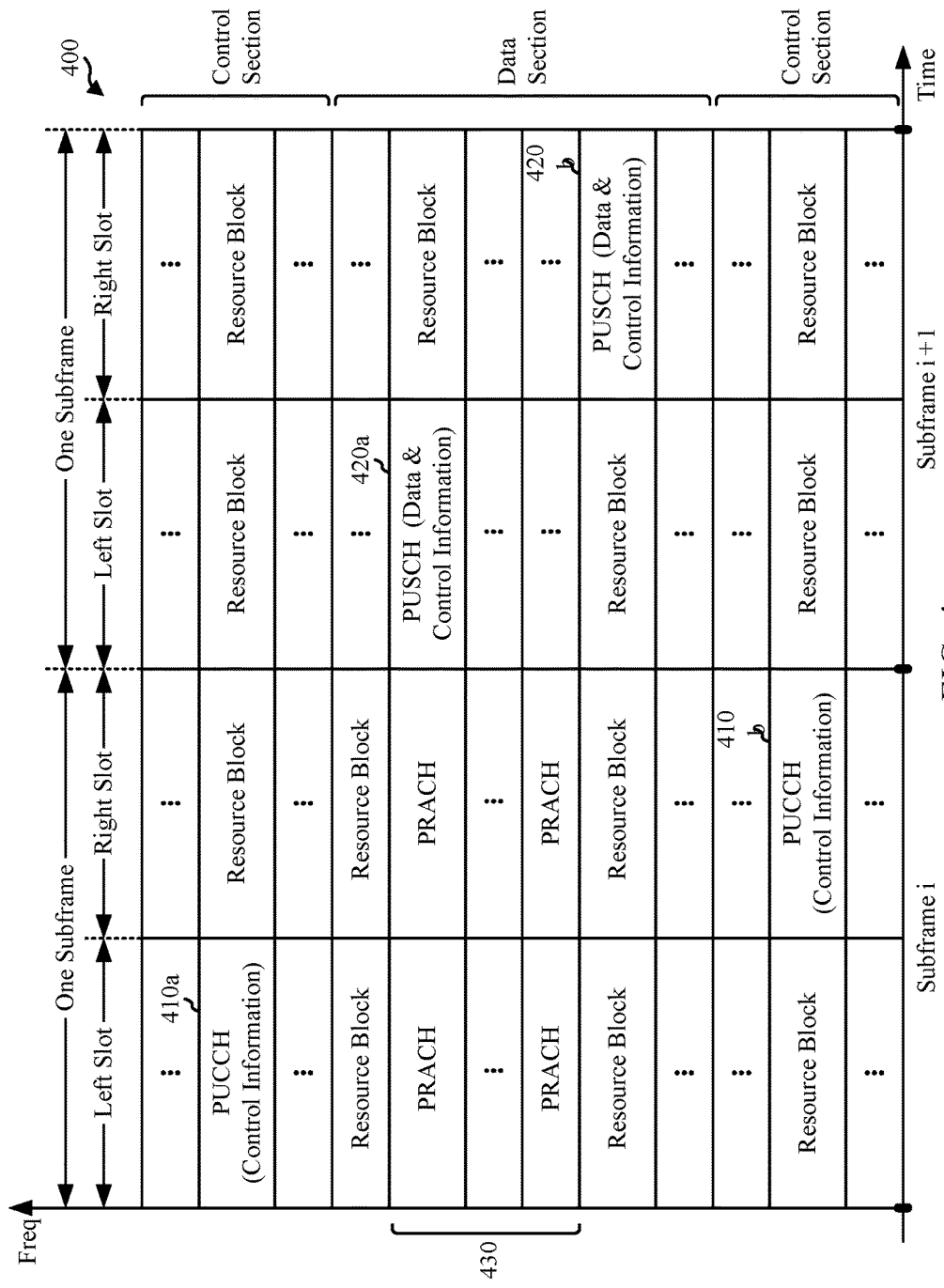
FIG. 4 is a diagram illustrating an example of an uplink frame structure in LTE.

FIG. 4 is a diagram 400 illustrating an example of an uplink frame structure in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The uplink frame structure results in the data section including contiguous subcarriers, which may allow a single UE to be assigned all of the contiguous subcarriers in the data section.

A UE may be assigned resource blocks 410a, 410b in the control section to transmit control information to an eNodeB. The UE may also be assigned resource blocks 420a, 420b in the data section to transmit data to the eNodeB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. An uplink transmission may span both slots of a subframe and may hop across frequency.

A set of resource blocks may be used to perform initial system access and achieve uplink synchronization in a physical random access channel (PRACH) 430. The PRACH 430 carries a random sequence and cannot carry any uplink data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
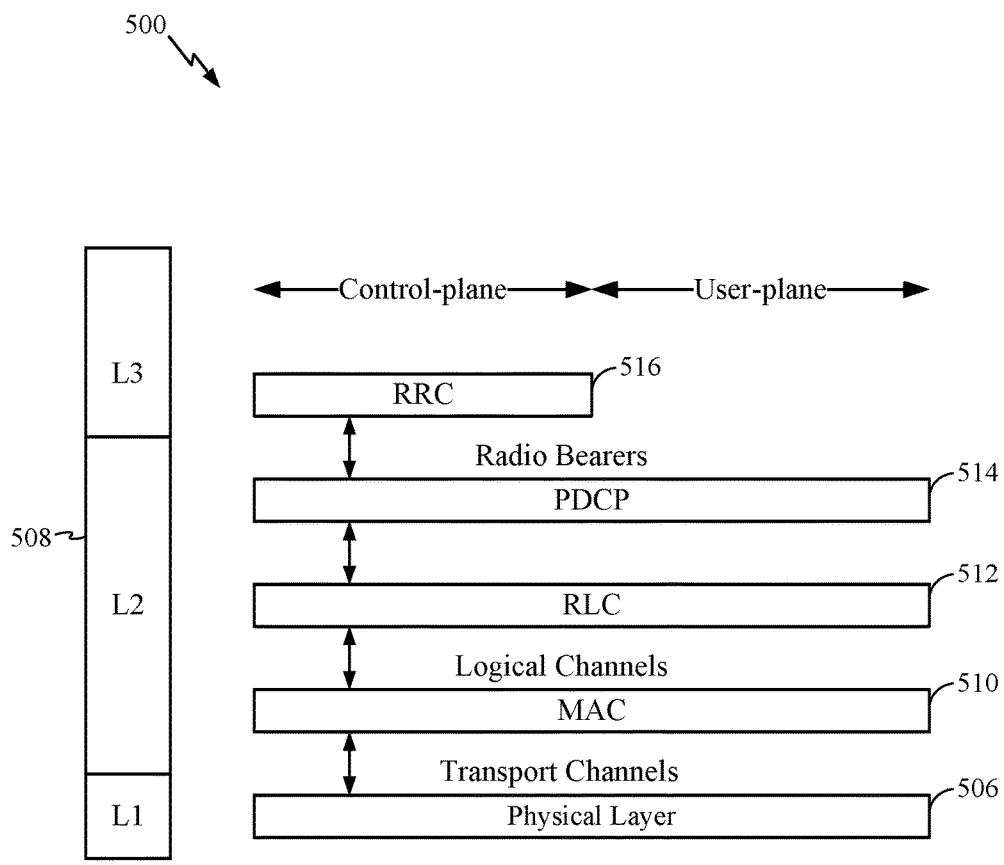
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNodeB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNodeB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNodeB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNodeBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNodeB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNodeB and the UE.

Figure 6:
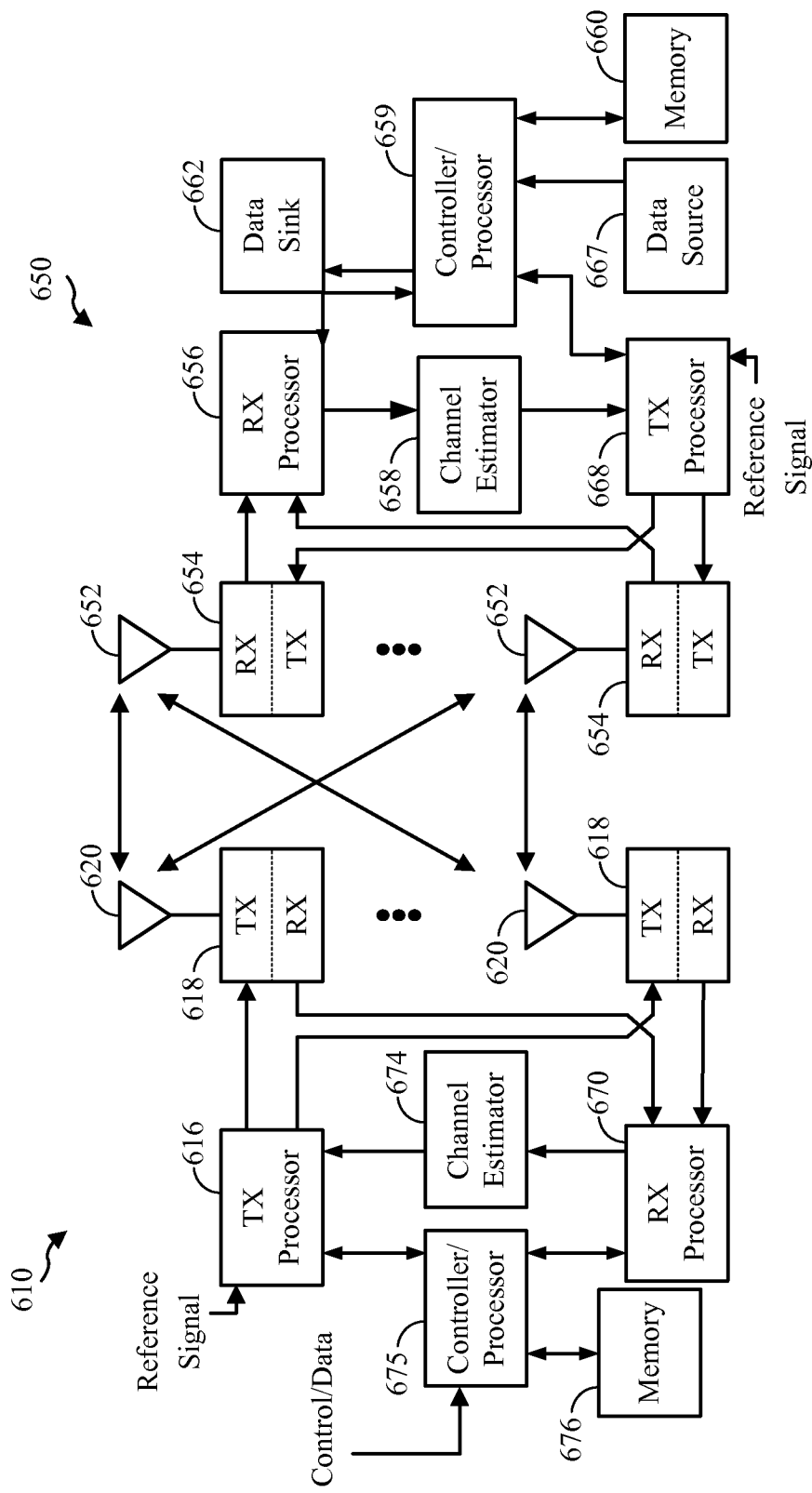
FIG. 6 is a diagram illustrating an example of an evolved Node B and user equipment in an access network.

FIG. 6 is a block diagram of an eNodeB 610 in communication with a UE 650 in an access network. In the downlink, upper layer packets from the core network are provided to a controller/processor 675. The controller/processor 675 implements the functionality of the L2 layer. In the downlink, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNodeB 610. These soft decisions may be based on channel estimates computed by the channel estimator 658. The soft decisions are then decoded and deinterleaved to recover the data and control signals that were originally transmitted by the eNodeB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the uplink, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the uplink, a data source 667 is used to provide upper layer packets to the controller/processor 659. The data source 667 represents all protocol layers above the L2 layer. Similar to the functionality described in connection with the downlink transmission by the eNodeB 610, the controller/processor 659 implements the L2 layer for the user plane and the control plane by providing header compression, ciphering, packet segmentation and reordering, and multiplexing between logical and transport channels based on radio resource allocations by the eNodeB 610. The controller/processor 659 is also responsible for HARQ operations, retransmission of lost packets, and signaling to the eNodeB 610.

Channel estimates derived by a channel estimator 658 from a reference signal or feedback transmitted by the eNodeB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The uplink transmission is processed at the eNodeB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the uplink, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

LTE Release 11 supports coordinated multipoint transmission schemes (CoMP) schemes. CoMP schemes refer to coordinated transmissions from multiple eNodeBs (downlink CoMP) or receptions from one or more UEs (uplink CoMP). Downlink CoMP and uplink CoMP may be separately or jointed enabled for a UE. Some examples of CoMP schemes are joint transmission (JT) (downlink CoMP) where multiple eNodeBs transmit the same data meant for a UE, and joint reception (uplink CoMP) where multiple eNodeBs receive the same data from a UE. CoMP schemes may also support coordinated beamforming (CBF) where an eNodeB transmits to the served UEs using beams that are chosen to reduce interference to UEs in neighboring cells. Additionally, CoMP schemes may also support dynamic point(s) selection (DPS) where the cell(s) involved in data transmissions change from subframe to subframe.

CoMP may exist in homogeneous networks and/or heterogeneous networks (HetNet). The connection between the nodes involved in CoMP can be X2 or fiber. In some cases, one or more virtual cell IDs may be configured for a UE on a shared channel for improved CoMP operation. In HetNet CoMP, low power nodes may be referred to as remote radio heads (RRH). Furthermore, the virtual cell ID to be used for a shared channel in a subframe may be dynamically indicated to the UE.

In some cases, to improve a CoMP operation, a demodulation reference signal (DM-RS) for a shared channel, such as the physical downlink shared channel (PDSCH), may be initialized based on virtual cell IDs. Specifically, the PDSCH DM-RS sequence may be initialized by:

$$c_{init}=(\lfloor n_s/2 \rfloor+1)\cdot(2X+1)\cdot 2^{16}+n_{SCID} \qquad (1)$$

In equation 1, $n_{SCID}$ is a scramble ID. The value X is a virtual cell ID and is configured by UE-specific higher layer signaling. Two candidate values of X may be configured, x(0) and x(1). The $n_{SCID}$ is reused for the dynamic selection of x(0) or x(1) only for rank one and rank two. When the rank is greater than two, then $n_{SCID}$ is equal to zero and x(0) is used. The value of x(n) may be between 0 and 503, furthermore, n is greater than or equal to zero and less than two.

In LTE Releases 8, 9, and 10, a control channel, such as a physical downlink control channel (PDCCH) is located in a first several symbols in a subframe. The control channel is fully distributed in the entire system bandwidth. The control channel is time multiplexed (TDMed) with a shared channel, such as a physical downlink shared channel (PDSCH). Thus, a subframe is divided into a control region and a data region.

In LTE Release 11, an enhanced control channel, such as the enhanced PDCCH (EPDCCH), is introduced. In contrast to a conventional control channel that occupies the first several control symbols in a subframe, the enhanced control channel may occupy the data region, similar to the shared channel (PDSCH). The enhanced control channel may increase control channel capacity, support frequency-domain inter-cell interference coordination (ICIC), improve spatial reuse of control channel resources, support beamforming and/or diversity, operate on the new carrier type and in multimedia broadcast over single frequency network (MBSFN) subframes, and coexist on the same carrier as conventional user equipments (UEs).

LTE Release 11 supports both localized and distributed transmissions of an enhanced control channel. Furthermore, LTE Release 11 supports demodulation reference signal (DM-RS) based enhanced control channels. The DM-RS based enhanced control channels may use antenna ports 107, 108, 109, and 110. A shared channel, such as the PDSCH, uses antenna ports 7-14.

The enhanced control channel is based on frequency division multiplexing (FDM). That is, the enhanced control channel spans both the first and second slots. In some cases, there may be a restriction on the maximum number of transport channel (TrCH) bits receivable in a transmission time interval (TTI). A shared channel and an enhanced control channel may not be multiplexed within a physical resource block (PRB) pair.

In some cases, the enhanced control channel demodulation reference signal (DM-RS) may use the same scrambling sequence generator defined for a shared data channel DM-RS. The scrambling sequence generator for the enhanced control channel DM-RS on ports 107~110 may be initialized by:

$$c_{init}=(\lfloor n_s/2 \rfloor+1) \cdot (2X \cdot 1) \cdot 2^{16}+n_{SCID} \qquad (2)$$

In equation 2, X is a virtual cell ID and is configured by UE-specific higher layer signaling. X has one value per EPDCCH resource set. A UE may be configured with one or more EPDCCH resource sets. The default value of X for the second EPDCCH resource set may be the same as the value for the first EPDCCH resource set. Furthermore, in equation 2, $n_{SCID}$ may be equal to two. That is the value of $n_{SCID}$ may be different from the possible values available for PDSCH (e.g., 0 or 1).

In some cases, for a first UE, a unicast EPDCCH DM-RS may use a first cell ID for the DM-RS sequence generation, and for a second UE, the unicast EPDCCH DM-RS may use a second cell ID for the DM-RS sequence generation. Furthermore, the broadcast EPDCCH DM-RS may use a third cell ID for the DM-RS sequence generation.

As an example, a unicast EPDCCH DM-RS for a first UE may be a function of virtual cell ID specified for the first UE. Similarly, a unicast EPDCCH DM-RS for a second UE may be a function of virtual cell ID specified for the second UE. Moreover, a broadcast/groupcast EPDCCH may have DM-RS as a function of a physical cell ID or a virtual cell ID common to a set of UEs. Aspects of the present disclosure are directed to multiplexing distributed EPDCCH of different UEs and/or different types of EPDCCHs (e.g., unicast and broadcast/groupcast) in a shared set of resources.

One aspect of the present disclosure is directed to a configuration that uses same DM-RS port(s). The configuration also specifies that a same cell ID is used for the UEs sharing a same set of enhanced control channel resources corresponding to the same DM-RS port(s). The same set of enhanced control channel resources may be in the form of a set of resources in a PRB pair, where a same set of DM-RS port(s) are used for decoding the EPDCCH with resources mapped to one or more of the set of resources in the PRB pair.

For example, for both unicast and broadcast/groupcast EPDCCH, antenna ports 107 and 109 may be specified for the same set of enhanced control channel resources for a distributed enhanced control channel for the normal cyclic prefix (CP). Moreover, a same cell ID may be used for the EPDCCHs that share the same enhanced control channel resources. That is, all of the EPDCCHs sharing the same resource pool may have the same cell ID for the DM-RS sequence generation.

As an example, distributed EPDCCH of a first UE, distributed EPDCCH of a second UE, and broadcast/groupcast EPDCCH may have resources mapped to the same PRB pair and share antenna ports 107 and 109 in the PRB pair. The resources used by each of the EPDCCH in the same PRB pair may be orthogonal to each other. In this case, a common cell ID (e.g., the physical cell ID) may be used for DM-RS of the EPDCCH of the first UE, DM-RS of the EPDCCH of the second UE, and DM-RS of the broadcast/groupcast EPDCCH. With the same cell ID, the DM-RS is substantially similar to a common reference signal shared by multiple EPDCCHs. These EPDCCHs may be multiplexed in the same PRB pair without a compromise to the EPDCCH performance.

Another aspect of the present disclosure is directed to a configuration that specifies different DM-RS ports but the same DM-RS resource(s) for EPDCCHs sharing a same set of enhanced control channel resources corresponding to the same DM-RS resource(s). The same set of enhanced control channel resources may be resources in a PRB pair, where a same set of DM-RS resources are used for decoding the EPDCCH using the resources in the PRB pair.

As an example, for unicast EPDCCH, antenna ports 107 and 109 may be specified for the enhanced control channel resources for a distributed enhanced control channel for the normal CP. Additionally, for a broadcast/groupcast EPDCCH, antenna ports 108 and 110 may be specified for the same enhanced control channel resources for a distributed enhanced control channel for the normal CP. In the present example, antenna ports 107 and 108 are mapped to a first set of resources, and antenna ports 109 and 110 are mapped to a second set of resources. Moreover, the same cell ID may be used for the UEs that share the same enhanced control channel resources. In this example, orthogonal DM-RS operation may be specified among different DM-RS ports mapped to the same DM-RS resources. Alternatively, different cell IDs can be used for EPDCCHs sharing the same enhanced control channel resources but based on different DM-RS port(s).

As an example, a first cell ID may be used for a DM-RS of EPDCCHs based on antenna port 107 and 109. Furthermore, a second cell ID may be used for a DM-RS of EPDCCHs based on antenna port 108 and 110. That is, the UEs sharing the same resource pool and the same antenna port(s) may have the same cell ID for the DM-RS sequence generation. Still, the UEs sharing the same resource pool but different antenna ports may have different cell IDs for the DM-RS sequence generation. In this case, there will be mutual interference between antenna ports 107/109 and antenna ports 108/110. Accordingly, the eNB may take the mutual interference into account in determining an aggregation level and/or a power control level for each EPDCCH.

Additionally, in the present configuration, the virtual cell ID configuration for a distributed enhanced control channel may be configured separately compared to the virtual cell ID configured for a localized enhanced control channel. For example, in one configuration, a reference signal of a distributed enhanced control channel is scrambled based on a physical cell ID (PCI). Furthermore, a reference signal for the localized enhanced control channel may be scrambled based on a virtual cell ID. After scrambling the reference signals, an eNodeB may transmit the distributed enhanced control channel and the localized enhanced control channel to a UE or different UEs.

As another example, in one configuration, a reference signal of a distributed enhanced control channel is scrambled based on a first virtual cell ID. Furthermore, reference signal for the localized enhanced control channel may be scrambled based on a second virtual cell ID. After scrambling the reference signals, an eNodeB may transmit the distributed enhanced control channel and the localized enhanced control channel to a UE or different UEs.

Another aspect of the present disclosure is directed to a configuration where different DM-RS ports mapped to different DM-RS resource(s) may be specified for the enhanced control channel resources. Furthermore, the same cell ID is used for UEs that share the same enhanced control channel resource and the same antenna port(s). Specifically, the UEs may be divided into two sets so that the UEs are orthogonal across the two sets. Furthermore, the first and second enhanced control channel messages may be transmitted to the UEs in overlapping physical resource blocks while maintaining the orthogonality between the first and second reference signals for each of the enhanced control messages. To maintain the orthogonality, the antenna ports for the first reference signal and the antenna ports for the second reference signal occupy non-overlapping resources.

In the present configuration, the same cell ID is used for the antenna ports within the same group. Additionally, in one configuration, the first group may be used for distributed enhanced control channel message transmission and the second group may be used for localized enhanced control channel transmissions. In yet another configuration, the first group may be used for broadcast/groupcast enhanced control channel message transmission and the second group may be used for unicast enhanced control channel transmissions.

That is, in the present configuration, a reference signal of a unicast enhanced control channel is scrambled based on a first cell ID and is transmitted to a first set of UEs from a first set of antenna ports. Additionally, a reference signal of a broadcast/groupcast enhanced control channel is scrambled based on a second cell ID and is transmitted to a second set of UEs on a second set of antenna ports. In the present configuration, the first and second cell IDs may be the same or may be different.

Furthermore, in the present configuration, a first group of antenna ports and a second group of antenna ports may occupy non-overlapping resources. For example, the first group may be ports 107 and 108, and the second group may be ports 109 and 110. That is, as an example, antenna ports 107 and 108 may be used for a first set of UEs. Additionally, antenna ports 109 and 110 may be used for a second set of UEs. Moreover, the two sets may have the same or different cell IDs.

As another example, in the present configuration, antenna ports 107 and 108 may be used for a unicast enhanced control channel. Additionally, antenna ports 109 and 110 may be used for a broadcast enhanced control channel. Furthermore, a first cell ID is used for the unicast enhanced control channel and a second cell ID is used for the broadcast enhanced control channel. In this configuration, the first cell ID and the second cell ID can be the same or different.

As an example, both cell IDs may be based on the physical cell ID. Alternatively, the first may be based on a virtual cell ID and the second may be based on the physical cell ID.

In some cases, because antenna ports 107 and 108 are code division multiplexed, a same cell ID is used for the enhanced control channels based on antenna ports 107 and 108 in order to specify an orthogonal operation between DM-RS based on port 107 and DM-RS based on port 108. That is, a lack of the aforementioned orthogonal operation may cause mutual interference between DM-RS based on antenna port 107 and DM-RS based on antenna port 108 may occur. The mutual interference may degrade EPDCCH performance. Similarly, a same cell ID is used for the enhanced control channels based on antenna ports 109 and 110

Similar antenna port issues also occur for localized EPDCCH between code division multiplexed antenna ports. That is, if a first UE monitors port 107 using a first cell ID for DM-RS and a second UE monitors port 108 using a second cell ID for DM-RS, the DM-RSs are no longer orthogonal.

To mitigate the aforementioned issue, in one configuration a UE is configured with two virtual cell IDs. A first virtual cell ID may be configured for the first entry in the code division multiplexed (CDM) pair and a second virtual cell ID may be configured for the second entry in the CDM pair. That is, one virtual cell ID is configured for antenna ports 107 and 109. Furthermore, another virtual cell ID is configured for antenna ports 108 and 110. Alternatively, one virtual cell ID is configured for antenna ports 107 and 108, and another virtual cell ID is configured for 109 and 110.

In another configuration, a UE is configured with one virtual cell ID. Furthermore, the eNodeB uses the same virtual cell ID for the UEs sharing the same pair of the code division multiplexed ports. That is, the eNodeB may scramble a reference signal of a first localized enhanced physical control channel based on first virtual cell ID. Furthermore, the eNodeB may scramble a reference signal of a second localized enhanced physical control channel based on second virtual cell ID. Furthermore, the eNodeB may transmit the first and second scrambled enhanced control channels to respective UEs. In one configuration, the virtual IDs are the same.

Figure 7:
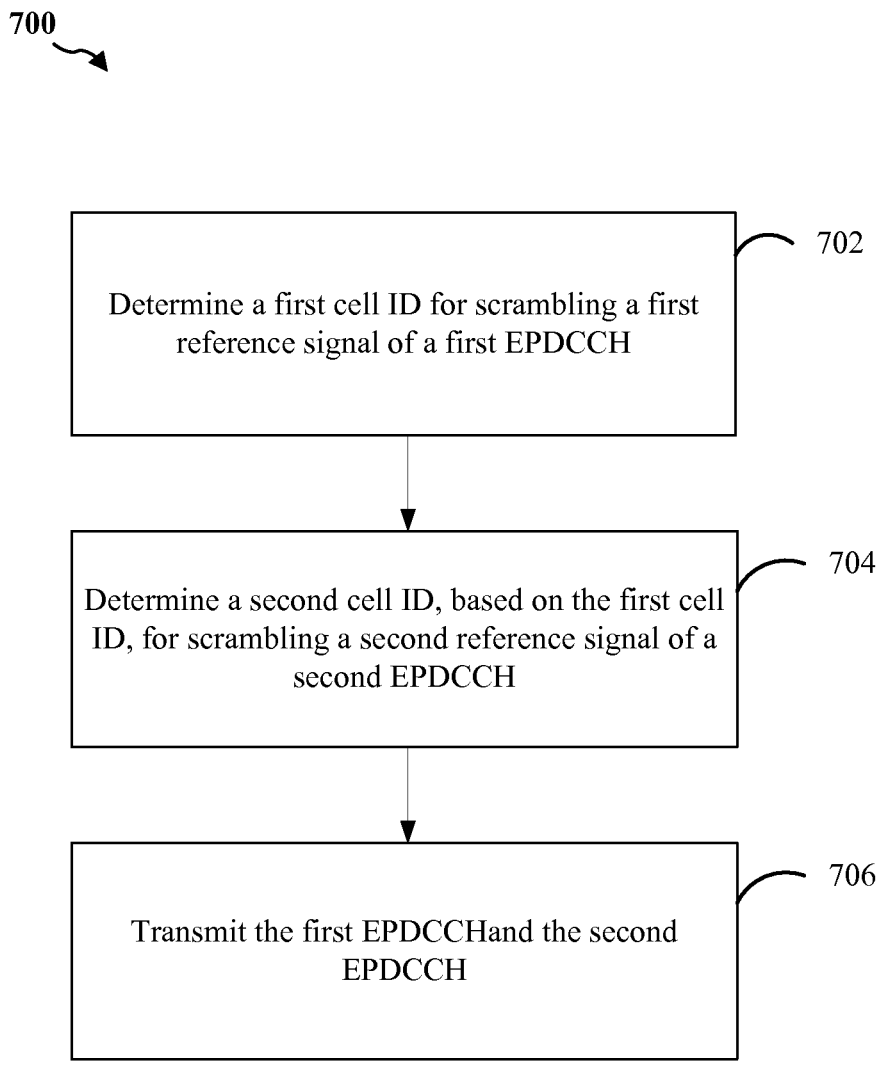
FIG. 7 is a block diagram illustrating a method for configuring cell IDs and antenna ports according to an aspect of the present disclosure.

FIG. 7 illustrates a method 700 for configuring cell IDs and antenna ports. In block 702, an eNodeB determines a first cell identification (ID) for scrambling a first reference signal of a first EPDCCH. The eNodeB determines a second cell ID for scrambling a second reference signal of a second EPDCCH in block 704. The determined second cell ID is based, at least in part, on the first cell ID. The first reference signal and the second reference signal may be mapped to a same set of resources. Next, in block 706, the eNodeB transmits the first EPDCCH and the second EPDCCH.

In one configuration, the eNodeB 610 (UE 650) is configured for wireless communication including a means for determining and means for scrambling. In one configuration, the determining and/or scrambling means may be the controller/processor 675, memory 646, the transmit processor 616, or a combination thereof configured to perform the functions recited by the determining means and the scrambling means. The eNodeB 610 is also configured to include a means for transmitting. In one configuration, the transmitting means may be the transmit processor 616, modulators 618 and antenna 620 configured to perform the functions recited by the transmitting means. In another configuration, the aforementioned means may be any module or any apparatus configured to perform the functions recited by the aforementioned means.

Figure 8:
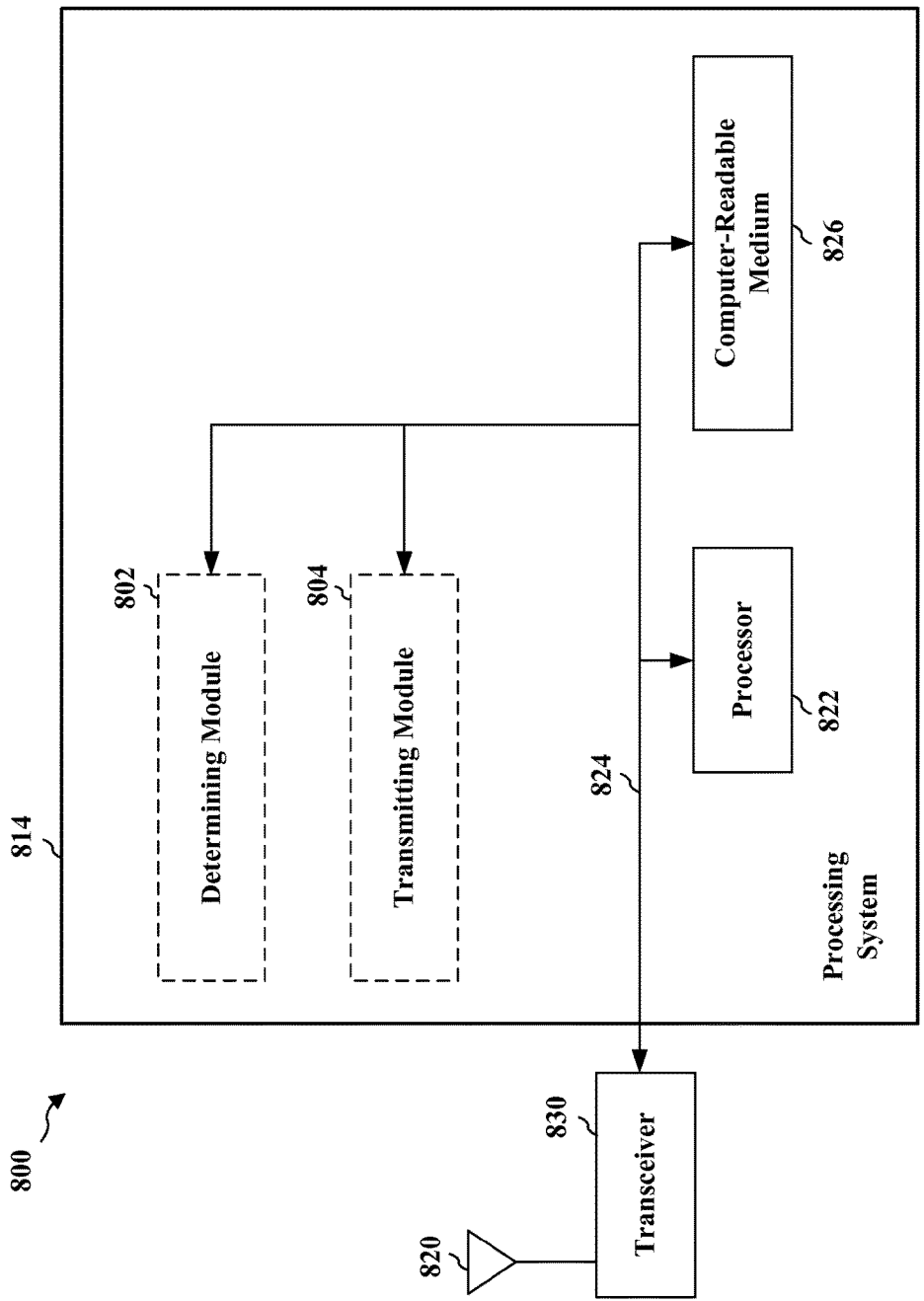
FIG. 8 is a block diagram illustrating different modules/means/components in an exemplary apparatus.

FIG. 8 is a diagram illustrating an example of a hardware implementation for an apparatus 800 employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware modules, represented by the processor 822 the modules 802, 804, and the computer-readable medium 826. The bus 824 may also link various other circuits such as timing sources, peripherals, voltage regulators, and power management circuits, which are well known in the art, and therefore, will not be described any further.

The apparatus includes a processing system 814 coupled to a transceiver 830. The transceiver 830 is coupled to one or more antennas 820. The transceiver 830 enables communicating with various other apparatus over a transmission medium. The processing system 814 includes a processor 822 coupled to a computer-readable medium 826. The processor 822 is responsible for general processing, including the execution of software stored on the computer-readable medium 826. The software, when executed by the processor 822, causes the processing system 814 to perform the various functions described for any particular apparatus. The computer-readable medium 826 may also be used for storing data that is manipulated by the processor 822 when executing software.

The processing system 814 includes a determining module 802 for determining a first cell ID for scrambling a first reference signal of a first EPDCCH. The determining module 802 may further determine a second cell ID, based on the first cell ID, for scrambling a second reference signal of a second EPDCCH. The determining module 802 may be one component as illustrated in FIG. 8 or may be separate components for determining each cell ID. The processing system 814 also includes a transmitting module 804 for transmitting a first EPDCCH message and a second EPDCCH message. The modules may be software modules running in the processor 822, resident/stored in the computer-readable medium 826, one or more hardware modules coupled to the processor 822, or some combination thereof. The processing system 814 may be a component of the eNodeB 6100 and may include the memory 676, and/or the controller/processor 675.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
mapping, at a first user equipment (UE), a receiver of the first UE to a set of antenna ports of a base station that are mapped to a second UE, such that the set of antenna ports are shared with the second UE, and a plurality of resource elements of the set of antenna ports are shared between the first UE and the second UE;
configuring, at the first UE, the receiver to receive a first reference signal on a first set of resource elements of a first enhanced physical downlink control channel (EPDCCH) transmitted from the set of antenna ports, a second reference signal intended for the second UE transmitted on a second set of resource elements of a second EPDCCH from the set of antenna ports, the first set of resource elements and the second set of resource elements selected from the plurality of resource elements, and the first set of resource elements differing from the second set of resource elements;
receiving, at the first UE from the base station, the first reference signal on the first set of resource elements of the first EPDCCH transmitted from the set of antenna ports;
descrambling the received first reference signal based at least in part on a cell identification (ID) shared with the second UE; and
demodulating a signal based at least in part on the descrambled first reference signal.

2. The method of claim 1, in which the cell ID is a physical cell ID or a virtual cell ID.

3. The method of claim 1, in which the first EPDCCH is a distributed EPDCCH and the second EPDCCH is a localized EPDCCH.

4. The method of claim 1, in which both the first EPDCCH and the second EPDCCH are distributed EPDCCHs.

5. The method of claim 1, in which the first EPDCCH is a unicast EPDCCH and the second EPDCCH is a broadcast EPDCCH.

6. The method of claim 1, in which the first reference signal comprises a demodulation reference signal (DM-RS).

7. An apparatus for wireless communications, comprising:
means for mapping, at a first user equipment (UE), a receiver of the first UE to a set of antenna ports of a base station that are mapped to a second UE, such that the set of antenna ports are shared with the second UE, and a plurality of resource elements of the set of antenna ports are shared between the first UE and the second UE;
means for configuring, at the first UE, the receiver to receive a first reference signal on a first set of resource elements of a first enhanced physical downlink control channel (EPDCCH) transmitted from the set of antenna ports, a second reference signal intended for the second UE transmitted on a second set of resource elements of a second EPDCCH from the set of antenna ports, the first set of resource elements and the second set of resource elements selected from the plurality of resource elements, and the first set of resource elements differing from the second set of resource elements;
means for receiving, at the first UE from the base station, the first reference signal on the first set of resource elements of the first EPDCCH transmitted from the set of antenna ports;
means for descrambling the received first reference signal based at least in part on a cell identification (ID) shared with the second UE; and
means for demodulating a signal based at least in part on the descrambled first reference signal.

8. The apparatus of claim 7, in which the first EPDCCH is a distributed EPDCCH and the second EPDCCH is a localized EPDCCH.

9. The apparatus of claim 7, in which both the first EPDCCH and the second EPDCCH are distributed EPDCCHs.

10. The apparatus of claim 7, in which the first EPDCCH is a unicast EPDCCH and the second EPDCCH is a broadcast EPDCCH.

11. A non-transitory computer-readable medium having program code recorded thereon, comprising:
program code to cause at least one computer to map, at a first user equipment (UE), a receiver of the first UE to a set of antenna ports of a base station that are mapped to a second UE, such that the set of antenna ports are shared with the second UE, and a plurality of resource elements of the set of antenna ports are shared between the first UE and the second UE;
program code to cause the at least one computer to configure, at the first UE, the receiver to receive a first reference signal on a first set of resource elements of a first enhanced physical downlink control channel (EPDCCH) transmitted from the set of antenna ports, a second reference signal intended for the second UE transmitted on a second set of resource elements of a second EPDCCH from the set of antenna ports, the first set of resource elements and the second set of resource elements selected from the plurality of resource elements, and the first set of resource elements differing from the second set of resource elements;
program code to cause the at least one computer to receive, at the first UE from the base station, the first reference signal on the first set of resource elements of the first EPDCCH transmitted from the set of antenna ports;
program code to cause the at least one computer to descramble the received first reference signal based at least in part on a cell identification (ID) shared with the second UE; and
program code to cause the at least one computer to demodulate a signal based at least in part on the descrambled first reference signal.

12. The computer-readable medium of claim 11, in which the cell ID is a physical cell ID or a virtual cell ID.

13. The computer-readable medium of claim 11, in which the first EPDCCH is a distributed EPDCCH and the second EPDCCH is a localized EPDCCH.

14. The computer-readable medium of claim 11, in which both the first EPDCCH and the second EPDCCH are distributed EPDCCHs.

15. The computer-readable medium of claim 11, in which the first EPDCCH is a unicast EPDCCH and the second EPDCCH is a broadcast EPDCCH.

16. A first user equipment (UE) for wireless communications, comprising:
a memory; and
at least one processor coupled to the memory, the at least one processor configured:
to map a receiver of the first UE to a set of antenna ports of a base station that are mapped to a second UE, such that the set of antenna ports are shared with the second UE, and a plurality of resource elements of the set of antenna ports are shared between the first UE and the second UE;

to configure the receiver to receive a first reference signal on a first set of resource elements of a first enhanced physical downlink control channel (EPDCCH) transmitted from the set of antenna ports, a second reference signal intended for the second UE transmitted on a second set of resource elements of a second EPDCCH from the set of antenna ports, the first set of resource elements and the second set of resource elements selected from the plurality of resource elements, and the first set of resource elements differing from the second set of resource elements;

to receive, from the base station, the first reference signal on the first set of resource elements of the first EPDCCH transmitted from the set of antenna ports;

to descramble the received first reference signal based at least in part on a cell identification (ID) shared with the second UE; and to demodulate a signal based at least in part on the descrambled first reference signal.

17. The first UE of claim 16, in which the cell ID is a physical cell ID or virtual cell ID.

18. The first UE of claim 16, in which the first EPDCCH is a distributed EPDCCH and the second EPDCCH is a localized EPDCCH.

19. The first UE of claim 16, in which both the first EPDCCH and the second EPDCCH are distributed EPDCCHs.

20. The first UE of claim 16, in which the first EPDCCH is a unicast EPDCCH and the second EPDCCH is a broadcast EPDCCH.

21. The first UE of claim 16, in which the first EPDCCH is from a common search space and the second EPDCCH is from a user equipment-specific search space.

* * * * *